United States Patent
Lafferty

[19]

[11] Patent Number: 6,047,923
[45] Date of Patent: Apr. 11, 2000

[54] AIRCRAFT HAVING MULTIPLE FUSELAGES

[75] Inventor: Patrick A. Lafferty, Dayton, Ohio

[73] Assignee: Trimbach Turbine, Ltd., Dayton, Ohio

[21] Appl. No.: 08/372,390

[22] Filed: Jan. 13, 1995

[51] Int. Cl.[7] ..................................... B64C 1/00
[52] U.S. Cl. .................. 244/15; 244/117 R; 244/119; 244/218; 244/120; 244/219; 244/135 R
[58] Field of Search .................... 244/15, 117 R, 244/36, 119, 120, 218–219, 118.1, 118.5, 135 R

[56] References Cited

U.S. PATENT DOCUMENTS

| | | | |
|---|---|---|---|
| D. 127,158 | 5/1941 | Oliver | D12/335 |
| D. 130,650 | 12/1941 | Silverstein | D12/335 |
| D. 138,801 | 9/1944 | Harrington | D12/335 |
| D. 158,736 | 5/1950 | Frank | D12/335 |
| 2,241,196 | 5/1941 | Gerin | 244/218 |
| 2,550,278 | 4/1951 | Makhonine . | |
| 2,616,509 | 11/1952 | Thomas . | |
| 2,623,721 | 12/1952 | Harrington | 244/135 R |
| 2,781,226 | 2/1957 | Tydon . | |
| 2,806,665 | 9/1957 | Gibson . | |
| 3,101,921 | 8/1963 | Price . | |
| 3,180,589 | 4/1965 | Fritzpatrick | 244/30 |
| 3,405,893 | 10/1968 | Flamand et al. . | |
| 3,463,420 | 8/1969 | Butler et al. . | |
| 3,869,102 | 3/1975 | Carroll . | |
| 3,913,871 | 10/1975 | Miller | 244/5 |
| 4,485,993 | 12/1984 | Mueller . | |
| 4,598,888 | 7/1986 | Beteille | 244/45 A |
| 4,776,537 | 10/1988 | Garside et al. | 244/130 |
| 4,824,053 | 4/1989 | Sarh . | |
| 5,086,996 | 2/1992 | Roeder et al. . | |
| 5,115,999 | 5/1992 | Buchsel et al. . | |

FOREIGN PATENT DOCUMENTS

| | | | |
|---|---|---|---|
| 1003096 | 3/1952 | France | 244/218 |
| 1439086 | 6/1976 | United Kingdom | 244/119 |

OTHER PUBLICATIONS

Gunster, Bill, Giants of the Sky, 1991, pp. 267–270 Sparaco/Toulouse, Pierre, "Airbus Pursues UHCA Design Studies", Aviation Week & Space Technology (Jun. 7, 1993), pp. 115 & 116.

*Primary Examiner*—Galen L. Barefoot
*Attorney, Agent, or Firm*—Biebel & French

[57] ABSTRACT

An aircraft having a central fuselage, a first side fuselage positioned immediately adjacent to and independent of the central fuselage, and a second side fuselage positioned immediately adjacent to and independent of the central fuselage located on the opposite side of the first side fuselage is disclosed. All of the engines powering the aircraft are located either on the wings outboard of the side fuselages or in the rear of the aircraft aft of the wings. Further, the aircraft may include wings positioned laterally from both side fuselages which may be partially retracted during flight.

12 Claims, 7 Drawing Sheets

AIRCRAFT HAVING MULTIPLE FUSELAGES

BACKGROUND OF THE INVENTION

1. Field of the Invention

The present invention relates to an aircraft having a plurality of fuselages for increased payload.

2. Description of Related Art

In the field of aeronautics, it has been a constant goal of aircraft operators to increase the amount of payload which can be transported in a single flight. Commercially speaking, market requirements dictate that the configuration of an aircraft be optimized for carrying the maximum payload of passengers and/or freight. This not only serves to limit the congestion of airports and air traffic by reducing the number of flights, but also reduces the operating cost of the flight. Accordingly, various fuselage designs have been analyzed and employed previously, as evidenced by U.S. Pat. No. 5,115,999 to Buchsel et al., U.S. Pat. No. 5,086,996 to Roeder et al., and U.S. Pat. No. 3,405,893 to Flamand et al.; however, such unconventional designs have been able to provide only moderate increases in payload capability. Each of these designs utilizes a single fuselage.

An aircraft design employing three separate and distinct fuselages is shown in a book entitled *Giants of the Sky*, by Bill Gunsten, which was based on a standard VC10 aircraft. While this arrangement increased the payload rather substantially, it used engines positioned between the central fuselage and the side fuselages. This arrangement radically departs from standard aircraft designs and is considered to be impractical.

It can be seen, then, that there is a need for a practical aircraft which significantly increases the payload which is available with present, single fuselage designs.

SUMMARY OF THE INVENTION

In accordance with one aspect of the present invention, an aircraft having a central fuselage, a first side fuselage positioned immediately adjacent to and independent of the central fuselage, and a second side fuselage positioned immediately adjacent to and independent of the central fuselage located on the opposite side of the first side fuselage is disclosed. All of the engines powering the aircraft are located either on the wings outboard of the side fuselages or in the rear of the aircraft aft of the wings. Further, the aircraft wings positioned laterally from both side fuselages may be partially retracted during flight.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1A:
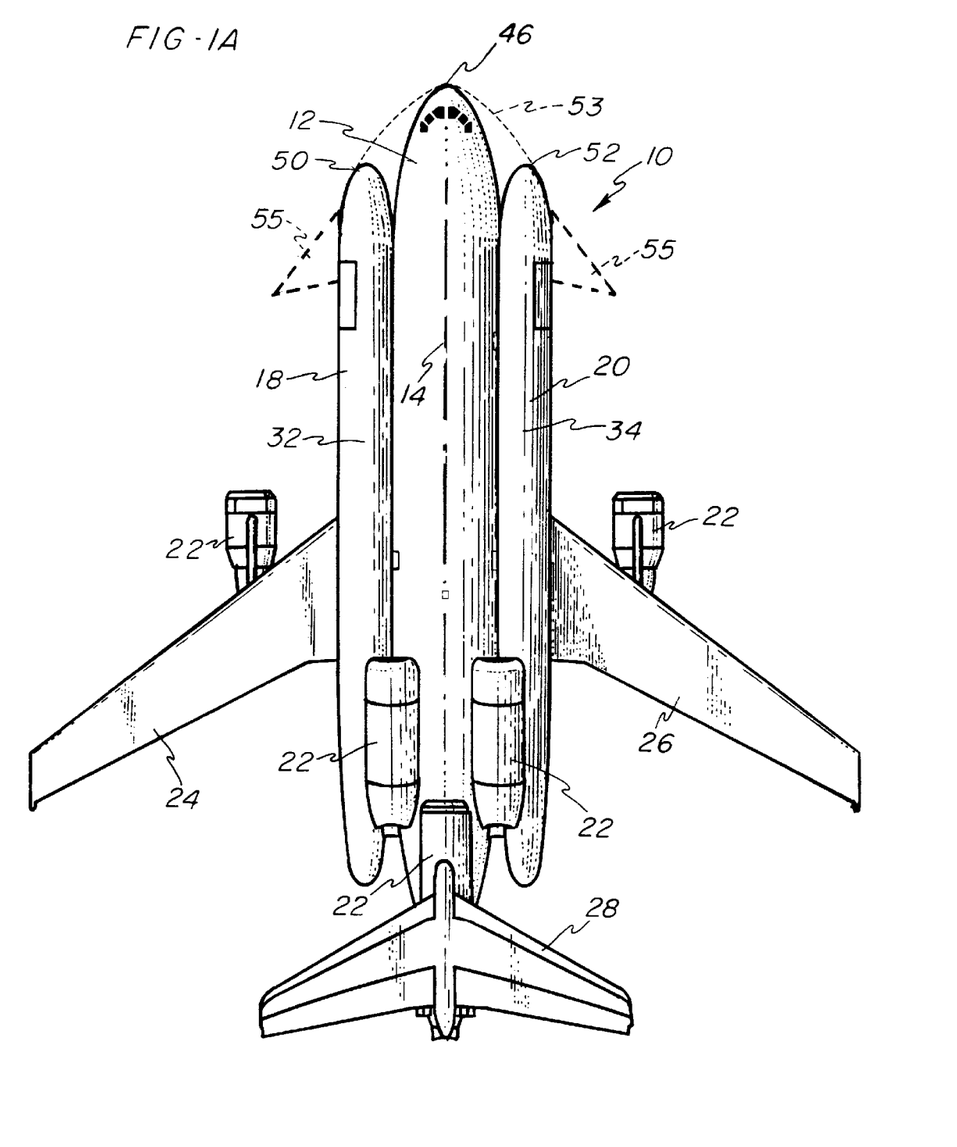
FIG. 1A is a top view a fixed wing aircraft of the present invention.

Referring now to the drawing in detail, wherein identical numerals indicate the same elements throughout the figures, FIG. 1A depicts an aircraft 10 having a plurality of fuselages. In particular, a central fuselage 12 is provided having a longitudinal axis 14 therethrough that is generally coincident with a centerline through aircraft 10. A first side fuselage 18 is positioned immediately adjacent to and independent of central fuselage 12 on the port side of aircraft 10. A second side fuselage 20 is positioned immediately adjacent to and independent of central fuselage 12, and is located on the starboard side of central fuselage 12 opposite first side fuselage 18. It will be seen that first and second side fuselages 18 and 20 are preferably substantially the same length and size, and are both in turn preferably shorter in length and smaller in size than central fuselage 12. In this regard, it is contemplated that existing fuselages be utilized, such as the McDonnell-Douglas MD-80 fuselage for side fuselages 18 and 20 and the McDonnell-Douglas MD-11 fuselage for central fuselage 12.

It will also be seen that a plurality of engines 22 are provided, such as on fixed wings 24 and 26 and tail section 28 of central fuselage 12. Additionally, as seen in FIG. 2, a number of known landing gear 30 are provided.

Longitudinal axes 32 and 34, respectively, are indicated for first and second side fuselages 18 and 20. Because first and second side fuselages 18 and 20 are positioned immediately adjacent central fuselage 12, where a "nesting" arrangement preferably takes place, it will be understood that longitudinal axes 32 and 34 of first and second side fuselages 18 and 20 are substantially parallel to longitudinal axis 14 of central fuselage 12. It will also be seen that longitudinal axes 32 and 34 lie in substantially the same plane, which may include longitudinal axis 14 of central fuselage 12. More specifically, as depicted in FIG. 2, a wall 36 of first side fuselage 18 will preferably abut against and be connected to a wall 38 of central fuselage 12. Likewise, a wall 40 of second side fuselage 20 will preferably abut against and be connected to wall 38 of central fuselage 12. Since central fuselage 12 and side fuselages 18 and 20 are generally cylindrical in shape, an area is formed immediately above the fuselage contact line which is configured for resting a pair of triangularly arced fuel tanks 42 and 44. Of course, walls 36 and 40 may be of a concave design so as to maximize the size of fuel tanks 42 and 44.

Figure 1B:
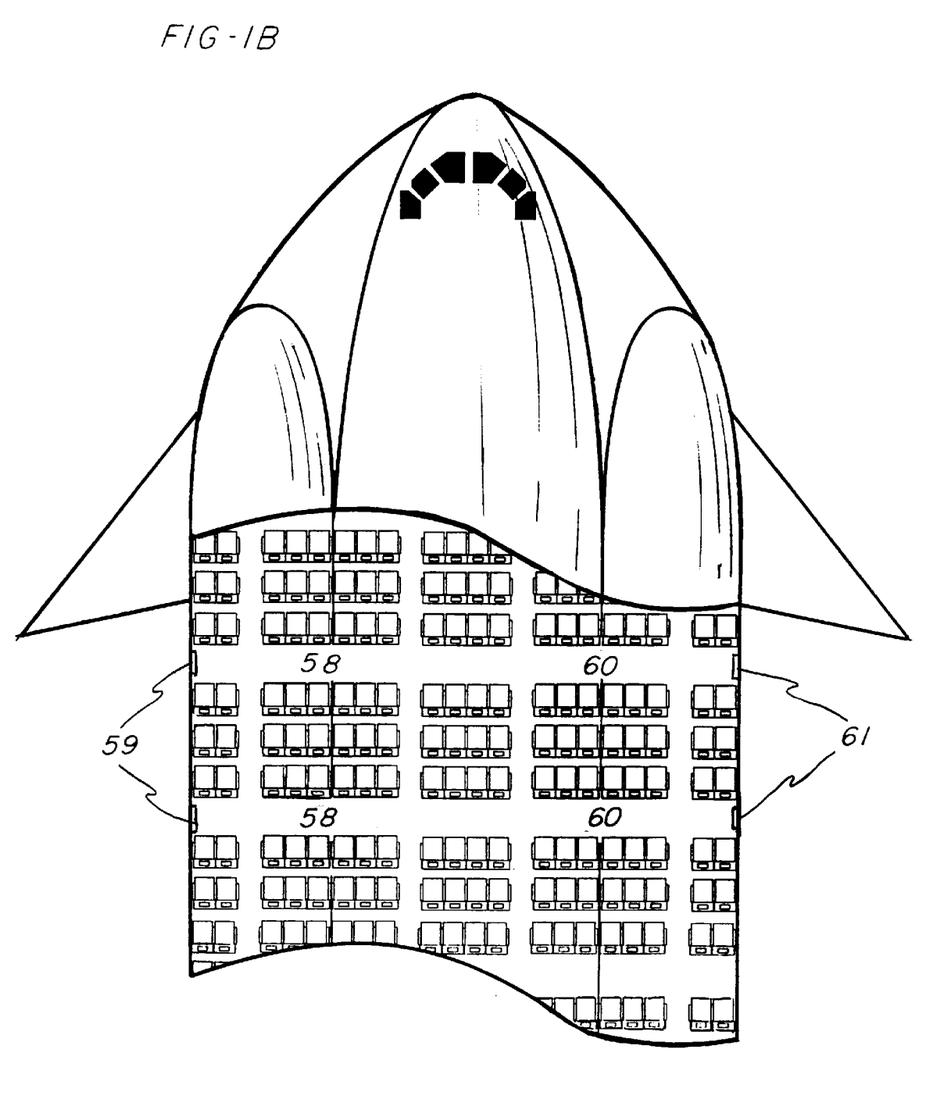
FIG. 1B is a partial top view of the aircraft depicted in FIG. 1, wherein a portion has been cut away to illustrate the interior of the fuselages.
Figure 2:
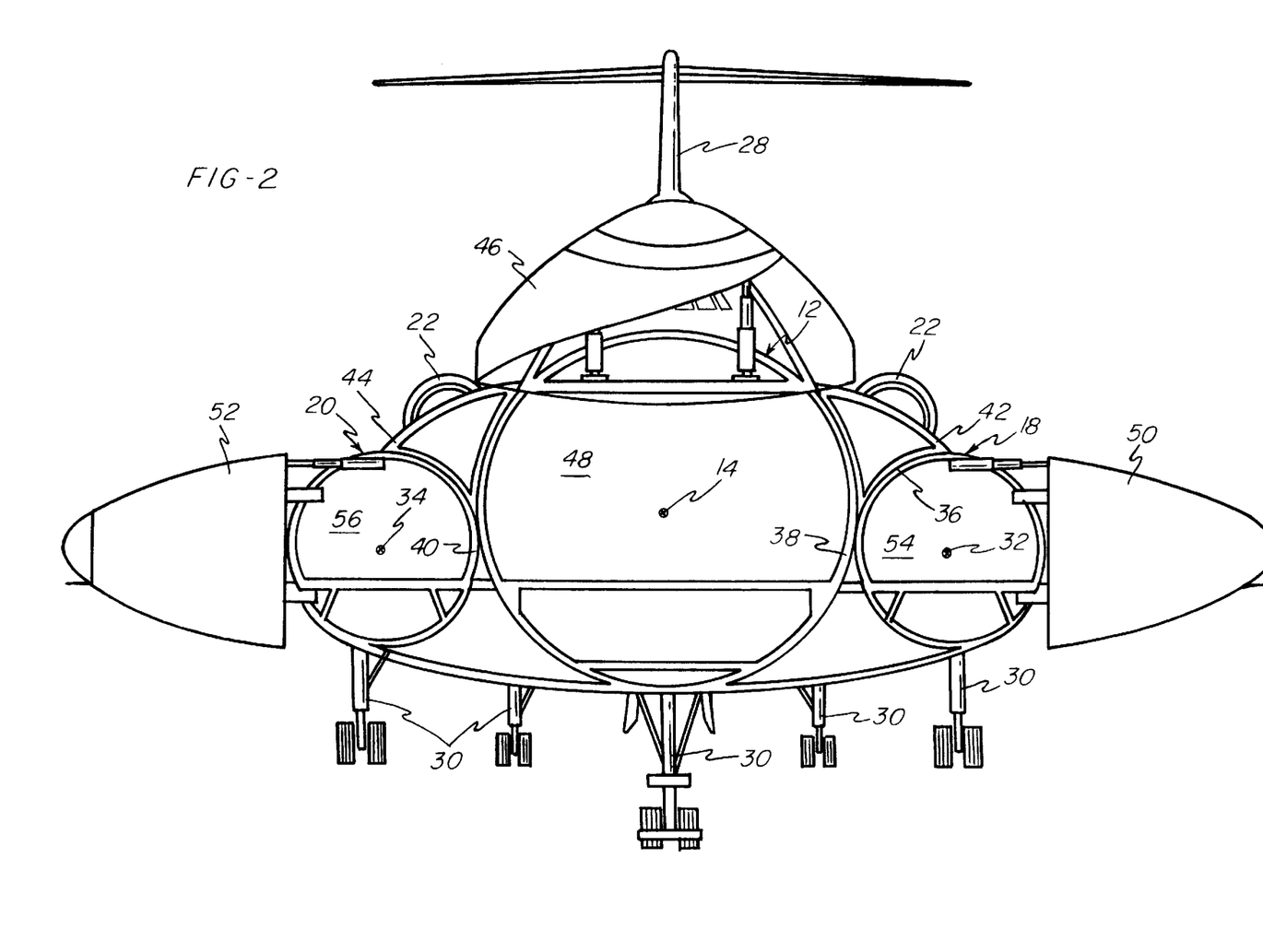
FIG. 2 is a partial front view of the aircraft depicted in FIG. 1.

As seen in FIG. 2, a front nose portion 46 of main fuselage 12 preferably is retractable to reveal a payload area 48 therein which may be configured for either passengers or freight (such as shown). Likewise, first and second side fuselages 18 and 20 also include retractable front nose portions 50 and 52, respectively, which also reveal payload areas 54 and 56. A common skin 53 may be attached to forward nose portions 46, 50, and 52 in order to improve the airflow about aircraft 10, but common skin 53 would limit the options available with regard to storing payload by means of nose portions 46, 50 and 52. Also, a pair of canards 55 are preferably positioned laterally from front nose portions 50 and 52 of first and second side fuselages 18 and 20 to improve longitudinal stability, as well as assist in take-off, maneuvering, and landing. A rearwardly mounted tail plane is also provided. In order to accommodate passenger movement within aircraft 10 and satisfy federal safety requirements, it is preferred that a plurality of passages 58 be provided between central fuselage 12 and first side fuselage 18, as well as a plurality of passages 60 between central fuselage 12 and second side fuselage 20. As best seen in FIG. 1B, passages 58 and 60 are preferably aligned with exit doors 59 and 61 leading from side fuselages 18 and 20, respectively.

Figure 3:
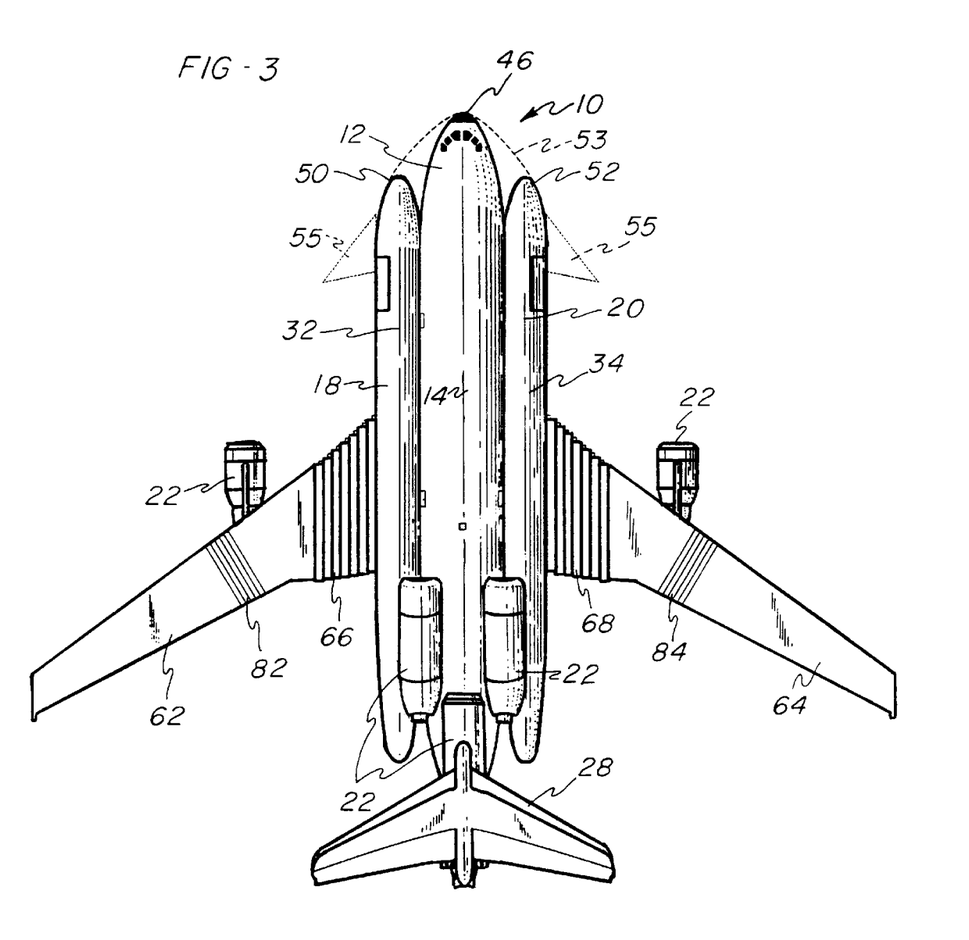
FIG. 3 is a top view of a partially retractable wing aircraft of the present invention.

Although aircraft 10 may utilize fixed wings as shown in FIG. 1A, one alternative embodiment of multiple fuselage aircraft 10 of the present invention is to utilize a pair of partially retractable wings 62 and 64 as depicted in FIG. 3. As seen therein, wings 62 and 64 are positioned laterally from first and second side fuselages 18 and 20. It will be noted that wings 62 and 64 preferably have retractable areas 66 and 68, respectively, which are positioned immediately adjacent first and second side fuselages 18 and 20. Accordingly, when wings 62 and 64 are retracted, it is contemplated that at least a portion of retractable areas 66 and 68 would be housed within first and second side fuselages 18 and 20.

In order to retract wings 62 and 64, a plurality of retractable suspension rods or spars 70 are positioned within retractable areas 66 and 68. Spars 70 are retracted by means of motors (not shown), which may be hydraulic or electric, that operate cranks or gears 76 (such as by rack and pinion mechanisms) engaged with spars 70. In this manner, wings 62 and 64 are caused to retract in a direction substantially perpendicular to longitudinal axes 32 and 34 of first and second side fuselages 18 and 20.

Figure 4:
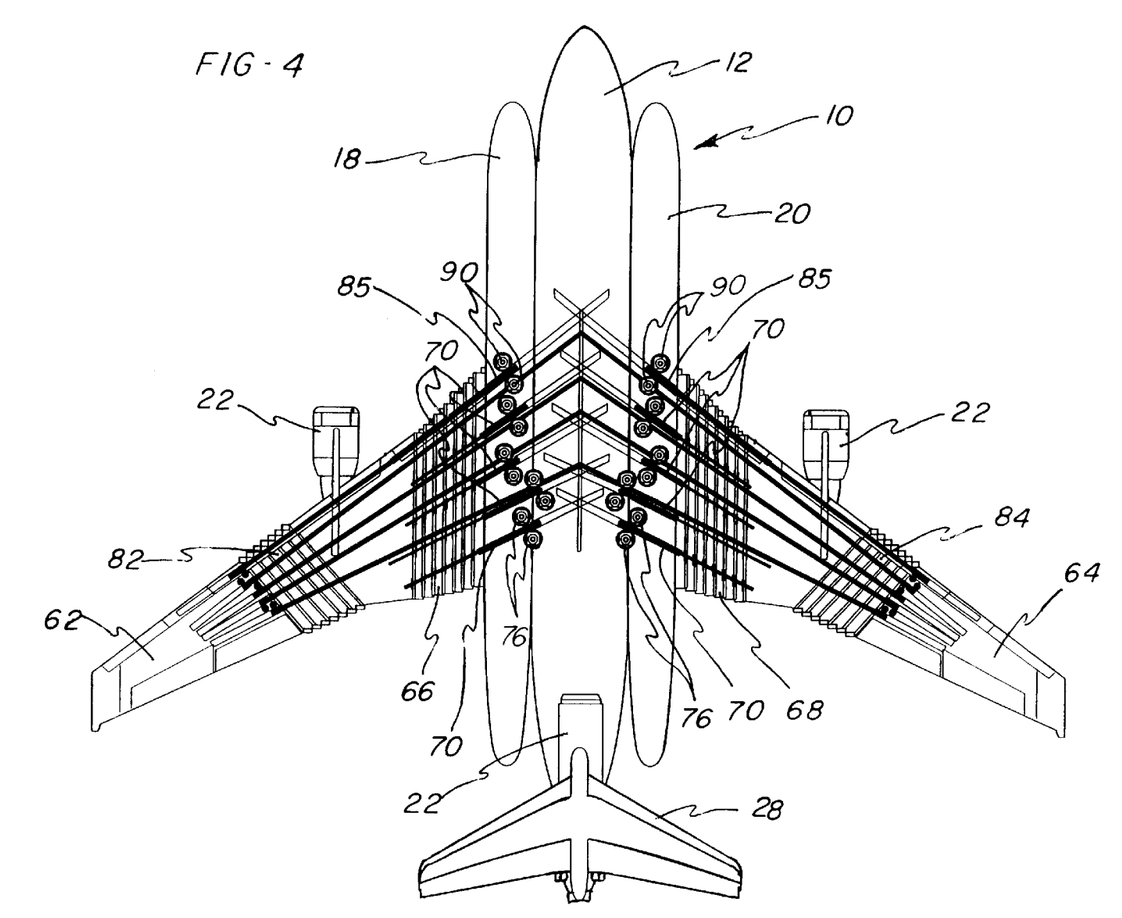
FIG. 4 is a top cross-sectional view of the aircraft depicted in FIG. 3.

Wings 62 and 64, either in addition to or instead of retractable areas 66 and 68, may include second retractable portions 82 and 84 located approximately at the midpoint of wings 62 and 64. In such case, a plurality of ribs 86 are joined to retractable spars 85, which are housed in storage tubes 87 provided in wings 62 and 64. As indicated above, spars 85 and consequently ribs 86 are retractable by means of motors in conjunction with cranks or gears 90 engaged with spars 85, which are located within the bulkhead (i.e., fuselages 12, 18 and 20).

Alternatively, ribs 86 may be capable of sliding toward central fuselage 12 independently by means of motors (e.g., hydraulic or electric) which operate cranks/gears 93, preferably of a rack and pinion design. It is seen that such cranks/gears 93 are located adjacent ribs 86 and interact with spars 85 through a bearing or the like. Of course, it will be understood that spars 85 are permanently attached at the bulkhead in this arrangement.

The prime importance of having partially retractable wings 62 and 64 with aircraft 10 relates to the additional wing span desirable for assisting aircraft 10 during take-off. Then, once take-off has been accomplished and aircraft 10 is in a cruising mode, wings 62 and 64 can be retracted for reduced drag and better fuel efficiency. Further, it will be understood that the ability to shorten wings 62 and 64 after take-off greatly enhances the ability of aircraft 10 to land and then taxi, which is an important consideration since space is a big problem in many airports.

Figure 6:
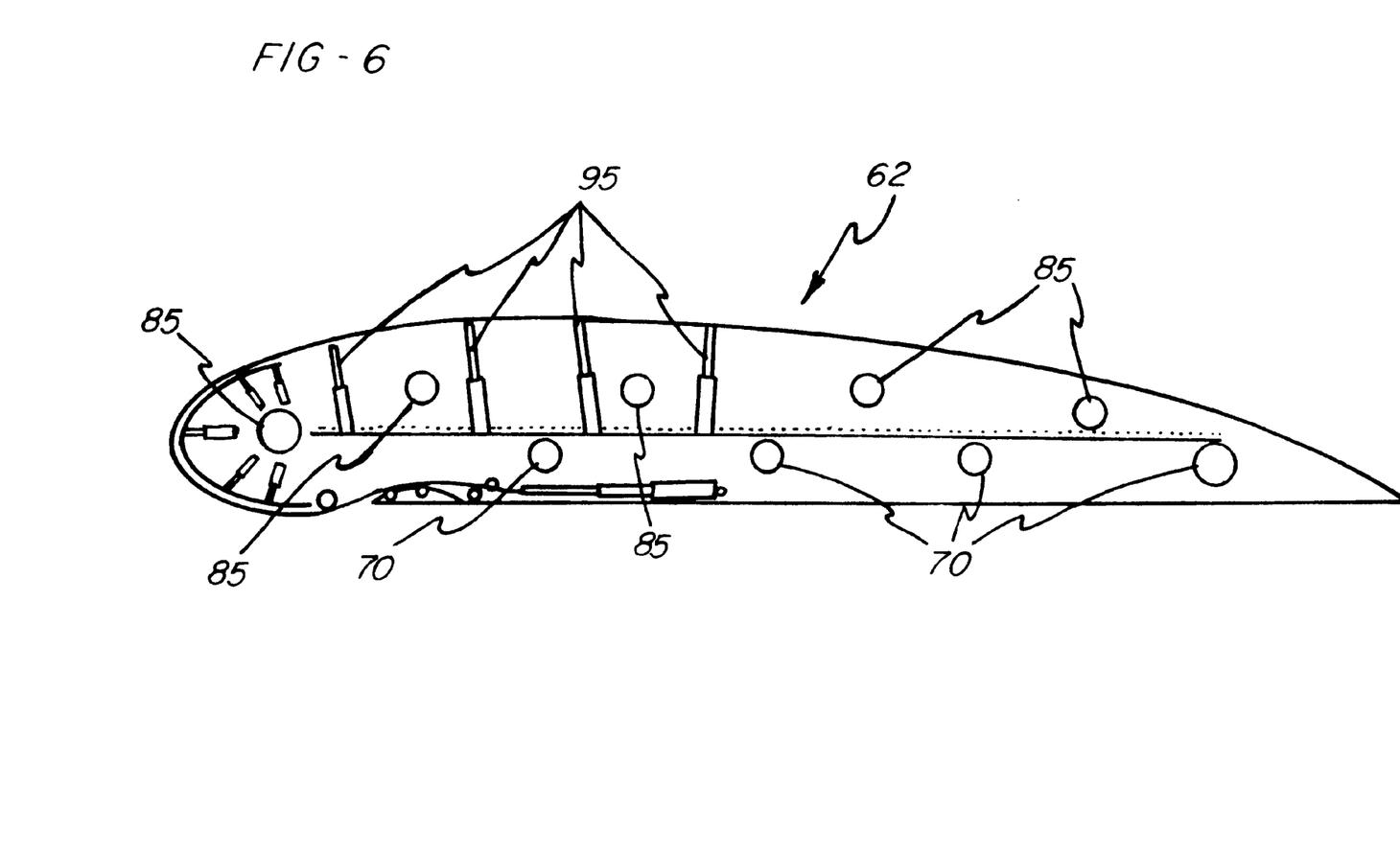
FIG. 6 is a schematic side view of a partially retractable wing as depicted in FIG. 4.

An important aspect of the present invention is to adapt wings 62 and 64 to the various missions of aircraft 10. Accordingly, wings 62 and 64 may also be adapted vertically (i.e., thickness), as well as partially retracted horizontally (ie., length). This is accomplished, as seen in FIG. 6, by means of cylinders 95 such as hydraulic or air cylinders. Cylinders 95 assist in both the critical shaping and additional thickness added to retracting portions 66, 68, 82 and 84.

Figure 5:
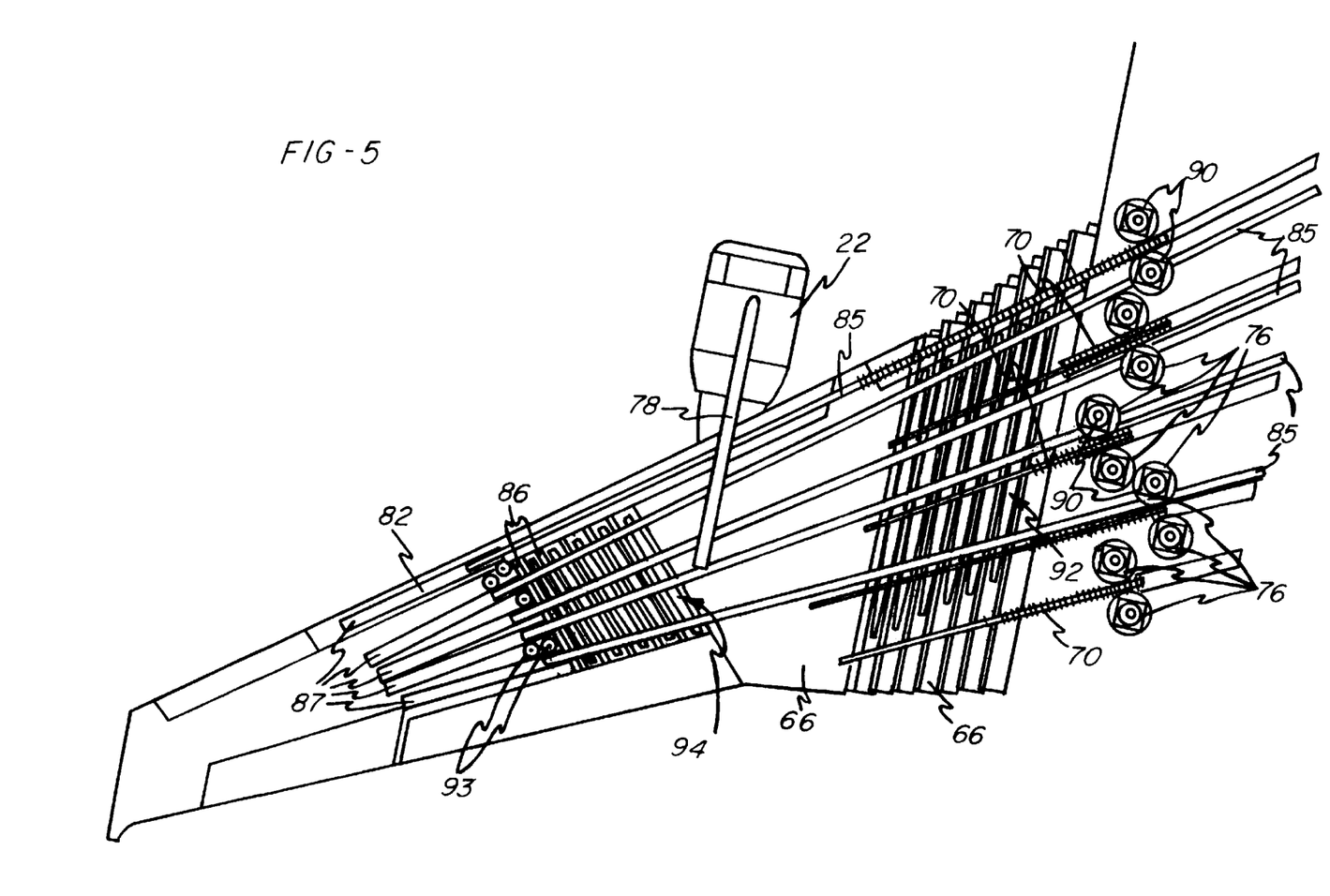
FIG. 5 is a partial top sectional view of a partially retractable wing in the aircraft depicted in FIG. 4, including a bladder within the retractable sections thereof.

Another enhancement to aircraft 10 is to include inflatable bladders, preferably of an accordion-type design, within the retractable areas of retractable wings 62 and 64. As shown in FIG. 5, a bladder 92 may be included in retractable areas 66 and 68 immediately adjacent first and second side fuselages 18 and 20, as well as another bladder 94 located within retractable areas 82 and 84 at the midpoint of wings 62 and 64. Bladders 92 and 94 may be utilized for additional fuel storage or even the storage of compressed gas (e.g., nitrogen) for use during take-off. Then, as bladders 92 and 94 are emptied during flight, retractable spars 70 and 85 and/or movable ribs 86 can be utilized to partially retract wings 62 and 64 as desired. Moreover, the extra fuel capacity in bladders 92 and 94 may be used to trim aircraft 10 by transferring fuel therefrom to fuel tanks 42 and 44 and maintaining the ever changing center of gravity.

Having shown and described the preferred embodiment of the present invention, further adaptations of the aircraft can be accomplished by appropriate modifications by one of ordinary skill in the art without departing from the scope of the invention.

What is claimed is:

1. An aircraft comprising:
   (a) a plurality of longitudinally extending fuselages sidewardly joined along a common horizontal plane with connecting passages therebetween, said plurality of longitudinally extending fuselages comprising a central fuselage and a pair of side fuselages mounted on opposite sides of said central fuselage;
   (b) a pair of mutually opposed and spanwise retractable wings secured to and extending outboard of said fuselages;
   (c) a pair of forwardly mounted canards secured to and extending outboard of said fuselages;
   (d) a rearwardly mounted tail plane;
   (e) a pair of engines mounted on said wings outboard of said side fuselages; and
   (f) a tapered fuel tank between said central fuselage and each of said side fuselages.

2. The aircraft of claim 1, wherein a longitudinal axis through each of said side fuselages is parallel to said longitudinal axis through said central fuselage.

3. The aircraft of claim 1, further comprising a tail section attached to an aft section of said central fuselage, wherein at least one engine for powering said aircraft is positioned on said tail section.

4. The aircraft of claim 1, wherein said central fuselage and each of said side fuselages comprises a retractable front nose portion for access therein.

5. The aircraft of claim 4, further comprising a common skin attached to the forward nose portions of said central and side fuselages.

6. The aircraft of claim 1, wherein said wings are retractable at approximately a midpoint of each wing.

7. The aircraft of claim 1, said wings comprising a plurality of internally disposed and slidable ribs extending sidewardly into said fuselages.

8. The aircraft of claim 1, wherein said side fuselages are substantially the same length and size.

9. The aircraft of claim 1, wherein said side fuselages are shorter in length and smaller in size than said central fuselage.

10. The aircraft of claim 1, wherein a plurality of seating and storage compartments is provided within said central and side fuselages.

11. The aircraft of claim 1, further comprising spanwise collapsible fuel tanks mounted inside each of said wings.

12. The aircraft of claim 11, said fuel tanks being configured and arranged for collapsing as fuel therein is drained and accommodating retraction of said wings by said collapsing.

\* \* \* \* \*